US006877773B1

(12) United States Patent
Bibb et al.

(10) Patent No.: US 6,877,773 B1
(45) Date of Patent: Apr. 12, 2005

(54) PILOT HYDRAULIC CONTROL FOR A PAIR OF STABILIZER LEGS ON A BACKHOE LOADER MACHINE

(75) Inventors: John S. Bibb, Apex, NC (US); Shane W. Kiger, Kernersville, NC (US); Kenneth J. McGuire, Garner, NC (US)

(73) Assignee: Caterpillar Inc, Peoria, IL (US)

( * ) Notice: Subject to any disclaimer, the term of this patent is extended or adjusted under 35 U.S.C. 154(b) by 459 days.

(21) Appl. No.: 09/587,544

(22) Filed: Jun. 5, 2000

(51) Int. Cl.[7] .................................................. B60S 9/10

(52) U.S. Cl. .................. 280/763.1; 74/527; 137/636.1; 180/324

(58) Field of Search .......................... 280/765.1, 766.1, 280/763.1, 764.1; 180/41, 324, 331; 307/142, 144, 114; 318/445, 466, 468; 361/191; 200/12, 19.36; 74/527, 528; 137/636.1, 636.2, 624.12

(56) References Cited

U.S. PATENT DOCUMENTS

| | | | | | |
|---|---|---|---|---|---|
| 3,001,417 | A | * | 9/1961 | Becker et al. | 74/528 |
| 3,442,531 | A | | 5/1969 | Rutledge | |
| 3,523,698 | A | | 8/1970 | Bishop | |
| 3,550,506 | A | * | 12/1970 | Gardenhour | |
| 3,764,162 | A | | 10/1973 | Rawlings | |
| 3,912,288 | A | | 10/1975 | F'Geppert | |
| 4,081,633 | A | * | 3/1978 | Bull | 200/453 |
| 4,121,065 | A | * | 10/1978 | Woodard | 200/43.01 |
| 4,124,226 | A | * | 11/1978 | Phillips | 280/765.1 |
| 4,130,981 | A | * | 12/1978 | Schumacher, II et al. | 56/208 |
| 4,288,196 | A | | 9/1981 | Sutton, II | |
| 4,342,335 | A | * | 8/1982 | Reinicker et al. | 137/636.2 |
| 4,355,660 | A | * | 10/1982 | Huffman | 137/625.63 |
| 4,394,912 | A | | 7/1983 | Epps et al. | |
| 4,466,637 | A | | 8/1984 | Nelson | |
| 4,496,004 | A | * | 1/1985 | Frase et al. | 172/311 |
| 4,596,404 | A | | 6/1986 | F'Geppert | |
| 4,703,612 | A | * | 11/1987 | Webster | 56/11.9 |
| 4,777,981 | A | * | 10/1988 | Petro | 137/636.2 |
| 4,827,982 | A | * | 5/1989 | Inagaki | 137/636.1 |
| 4,863,184 | A | | 9/1989 | Mena | |
| 5,056,985 | A | * | 10/1991 | Johnson et al. | 414/694 |
| 5,232,057 | A | * | 8/1993 | Renard | 172/812 |
| 5,329,163 | A | * | 7/1994 | Satoh et al. | 307/10.1 |
| 5,580,095 | A | * | 12/1996 | Fukumoto | 280/840 |
| 6,065,365 | A | * | 5/2000 | Ostler et al. | 74/528 |

OTHER PUBLICATIONS

Hercules Hydraulics Master Component Catalog, Jan. 2000, pp. 392–393.*

U.S. Appl. No. 09/314,728, filed May 18, 1999.

* cited by examiner

*Primary Examiner*—Christopher P. Ellis
*Assistant Examiner*—Christopher Bottorff
(74) *Attorney, Agent, or Firm*—D. L. Charlton; D. J. Barnes

(57) ABSTRACT

Automatic and simultaneous retraction of a pair of stabilizer legs for a backhoe loader machine is beneficial for the operator (not shown). Instead of retracting the stabilizer legs by manually holding a pair of control levers continuously in a retract position, the operator (not shown) may simply move the control levers to an auto-retract position. The movement of the control levers in such a manner activates a control switch in connection with each of the control levers. The control switches, in turn, activate a timer relay that activates a solenoid detent operative with each control lever. Once the solenoid detents are in an activated state, the operator (not shown) may relinquish contact with the control levers. The solenoid detents will retain the control levers in the auto-retract position via electro-magnetic forces. The timer relay controls the solenoid detents so that the control levers are retained in the auto-retract position for a preselected time to fully retract the stabilizer legs from any one of a plurality of extended positions.

20 Claims, 4 Drawing Sheets

PILOT HYDRAULIC CONTROL FOR A PAIR OF STABILIZER LEGS ON A BACKHOE LOADER MACHINE

TECHNICAL FIELD

This invention relates generally to the use of pilot hydraulics for controlling a pair of stabilizer legs for a backhoe loader machine and more particularly to the ability to simultaneously retract the pair of stabilizer legs from an extended position to a fully retracted position.

BACKGROUND ART

It is well known that a machine, such as a backhoe loader, is used to dig ditches, foundations, basements, and the like. During such machining operations, the backhoe loader machine utilizes a pair of stabilizer legs to maintain a steady and solid working foundation. The foundation is established when the pair of stabilizer legs are extended either individually or together by separate and continuous activation of a pair of control switches. Each one of the pair of control switches is coupled with a respective one of the pair of stabilizer legs and the amount of stabilizer leg extension depends on the surrounding terrain. Generally, upon completion of machining operations, the pair of stabilizer legs are retracted through the separate and continuous activation of the pair of control switches. The ability to retract both of the stabilizer legs simultaneously without continuous operation of the pair of control switches, however, would be beneficial for an operator due to an ease in operation.

A design disclosed in U.S. Pat. No. 4,124,226 issued to Frank T. Phillips on Nov. 7, 1978 utilizes four hydraulically operated outrigger assemblies on a mobile crane. A control system is provided for operating the eight cylinders to extend, retract, and lower and raise the outriggers through actuation of horizontal and vertical stabilizer cylinders, respectively. Simultaneous extension or retraction of the outrigger assemblies is achieved by the continuous operation of various switches in combination. Unfortunately, the ability to simultaneously retract the outrigger assemblies through a single switch that does not require continuous operation is not disclosed. The ability to simultaneously retract the outrigger assemblies in such a manner would improve operator flexibility by lessening the time and energy normally spent on retracting the outrigger assemblies.

The present invention is directed to overcoming the problems as set forth above.

In one aspect of the present invention, a method is disclosed for automatically retracting a stabilizer leg for a work machine. The work machine is operatively associated with a power source and has a control device for selecting forward or reverse directions of movement. The method includes utilizing a control lever for moving the stabilizer leg between fully extended and fully retracted positions. The control lever is normally located in and biased to a neutral position. Next, manually moving the control lever to either of an extend position or a retract position. Then, manually holding the control lever in either of the extend or retract positions to respectively extend or retract the stabilizer leg to any of a plurality of desired positions between the fully extended and fully retracted positions. Next, manually moving the control lever to an auto-retract position. Finally, retaining the control lever in the auto-retract position without further manual manipulation thereof through a responsive means that overcomes the biasing action of the control lever to facilitate the automatic retraction of the stabilizer leg from any of the plurality of desired positions to the fully retracted position.

In another aspect of the present invention, a work machine has front and rear end portions. A control panel is disposed within an interior of the work machine. A pair of stabilizer legs are connected to the rear end portion. A hydraulic cylinder is operatively associated with each of the pair of stabilizer legs for moving the stabilizer legs in a plurality of desired positions between fully extended and fully retracted positions via a source of hydraulic fluid. A control device is located within the interior of the work machine for selecting the forward or reverse direction of the work machine. The present invention comprises a main valve that is connectable with each of the hydraulic cylinders for controlling the movement of the stabilizer legs. A pair of pilot valves are in connection with each of the main valves. A pair of control levers are in connection with a respective pair of pilot valves for actuation thereof. The control levers are normally biased to a neutral position and movable between a first position for actuating the main valves in response to the actuation of one of the pilot valves to extend the stabilizer legs to any of the desired positions, a second position for actuating the main valves in response to the actuation of the other of the one of the pilot valves to retract the stabilizer legs to any of the desired positions, and a third position. Means are provided for automatically retaining the pair of control levers in the third position for actuating the main valves in response to the actuation of the other one of the pilot valves to simultaneously retract the stabilizer legs from any of the desired positions to the fully retracted position within a preselected period of time.

In yet another aspect of the present invention, a method is disclosed for automatically retracting a stabilizer leg for a work machine. The work machine is operatively associated with a power source and has a control device for selecting forward or reverse directions of movement for the work machine. The method comprises the steps of utilizing a pair of control levers for moving a pair of stabilizer legs between fully extended and fully retracted positions. The control levers are normally located in a neutral position and movable to first, second, and third positions. The movement of either of the control levers to the first position promotes the movement of a respective stabilizer leg to a plurality of extended positions and the movement of either of the control levers to the second position promotes the movement of the respective stabilizer leg to a plurality of retracted positions. The control levers are biased to the neutral position when in the first, second, or third positions. Next, the method includes moving either of the control levers to the third position. Finally, automatically maintaining either of the control levers in the third position to overcome the biasing action on the control levers for moving the respective stabilizer leg from any of the plurality of extended or retracted positions to the fully retracted position.

The present invention includes the ability to simultaneously retract a pair of stabilizer legs for a work machine through a control lever that is automatically retained in a auto-retract position for a preselected time. The simultaneous and automatic retraction of the pair of stabilizer legs increases ease of operation and operator flexibility.

BEST MODE FOR CARRYING OUT THE INVENTION

Figure 1:
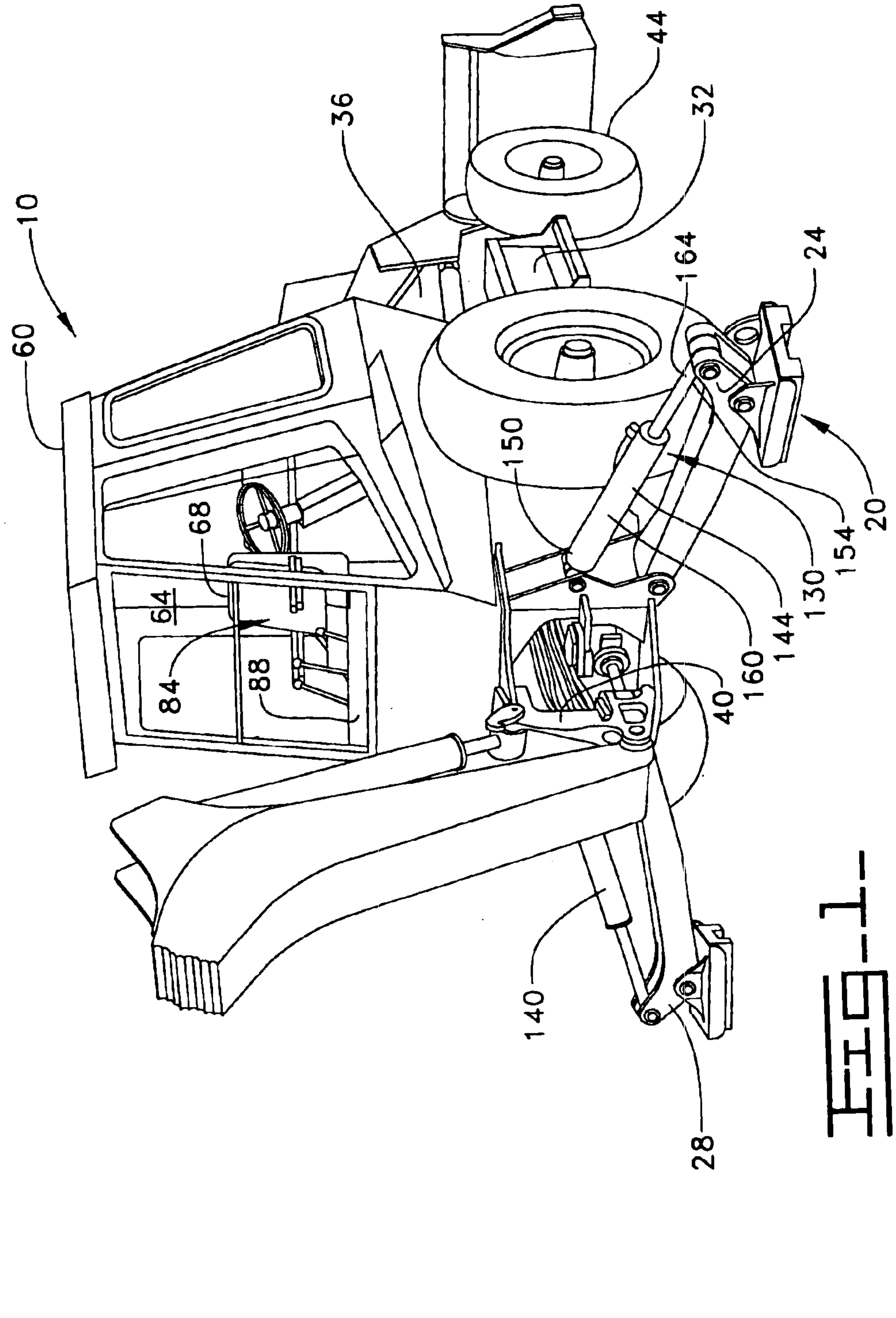
FIG. 1 is a side elevational view of a backhoe loader machine having an extension and retraction system for a pair of stabilizer legs in accordance with the present invention and depicting the stabilizer legs in an extended position.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
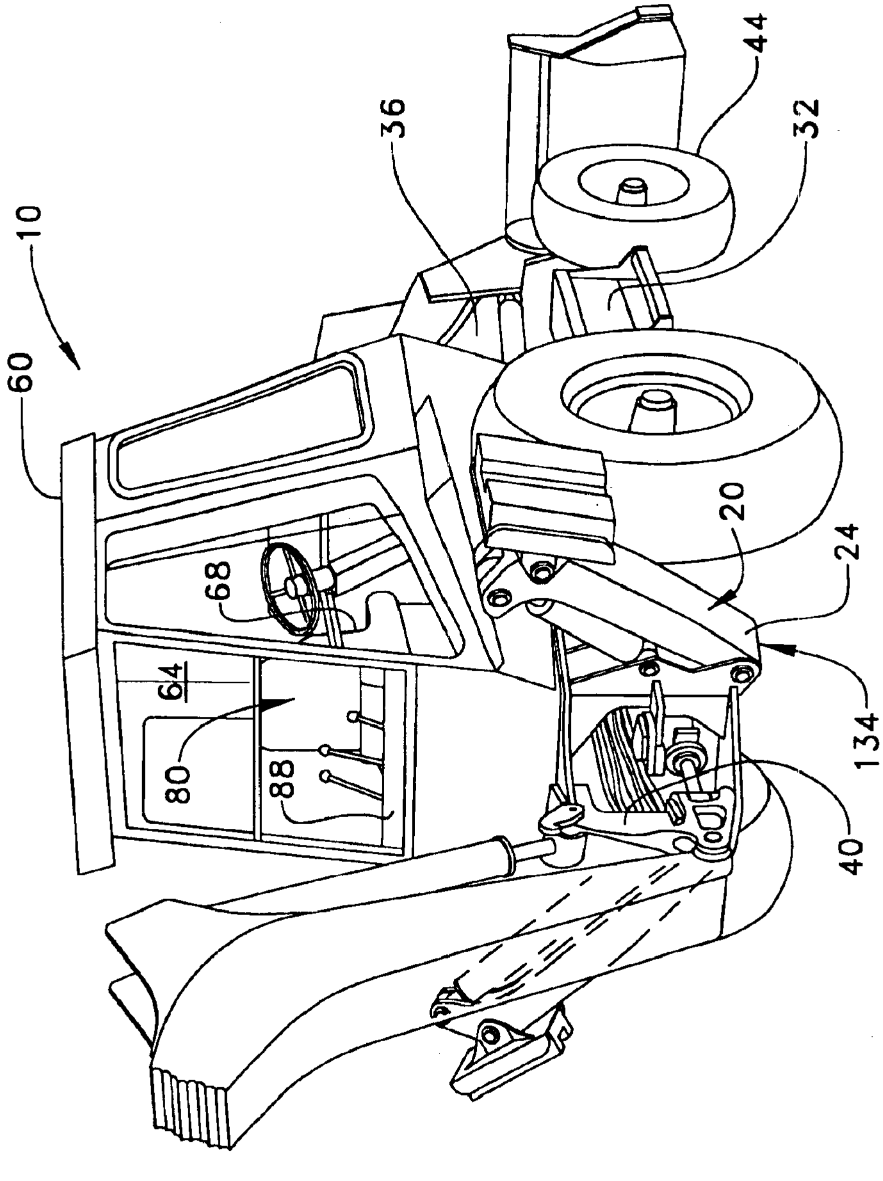
FIG. 2 is a side elevational view of the backhoe loader machine of FIG. 1 depicting the stabilizer legs in a fully retracted position.

Referring to FIGS. 1–2, a work machine 10, such as a backhoe loader, is shown incorporating an extension and retraction system 20 for a pair of stabilizer legs 24,28. Although the present invention is shown in operative association with a backhoe loader, it should be understood that the present invention may be incorporated on any suitable work machine 10.

Referring now to FIGS. 1–4, the backhoe loader 10 includes a machine frame 32 with front and rear end portions 36,40 supported for travel by a plurality of wheels, one of which is shown at 44. An electrical power source 48, such as a battery, is disposed in a well known manner within the frame 32 of the backhoe loader 10 and is shown schematically in FIGS. 3–4. A cab 60 is mounted on the frame 32 in a well-known manner and has an interior portion 64. The interior portion 64 includes a seat 68 therein for occupation by an operator (not shown). The seat 68 swivels between front and rear positions 80,84 (the rear position 84 being shown in FIG. 1 and the front position 80 being shown in FIG. 2). When the seat 68 is in the rear position 84, it faces a rear control panel 88. The rear control panel 88 is connected in a well-known manner within the interior portion 64 of the cab 60.

The pair of stabilizer legs 24,28 are secured on the rear end portion 40 of the frame 32 in a conventional manner. The stabilizer legs 24,28 are movable between a fully extended position 130 (shown in FIG. 1) and a fully retracted position 134 (shown in FIG. 2). It should be understood that the stabilizer legs 24,28 may be positioned at any one of a plurality of positions along the fully extended and fully retracted positions 130,134. The movement of the stabilizer legs 24,28 is accomplished through a respective pair of hydraulic cylinders 140,144. Each of the pair of hydraulic cylinders 140,144 are connected in a well-known manner at a first end 150 to the frame 32 and at a second end 154 to a respective one of the pair of stabilizer legs 24,28. The hydraulic cylinders 140,144 may be of any suitable type, but preferably are double actuated. The double actuated hydraulic cylinders 140,144 each include a housing 160 with a piston and rod assembly 164 therein.

Figure 3:
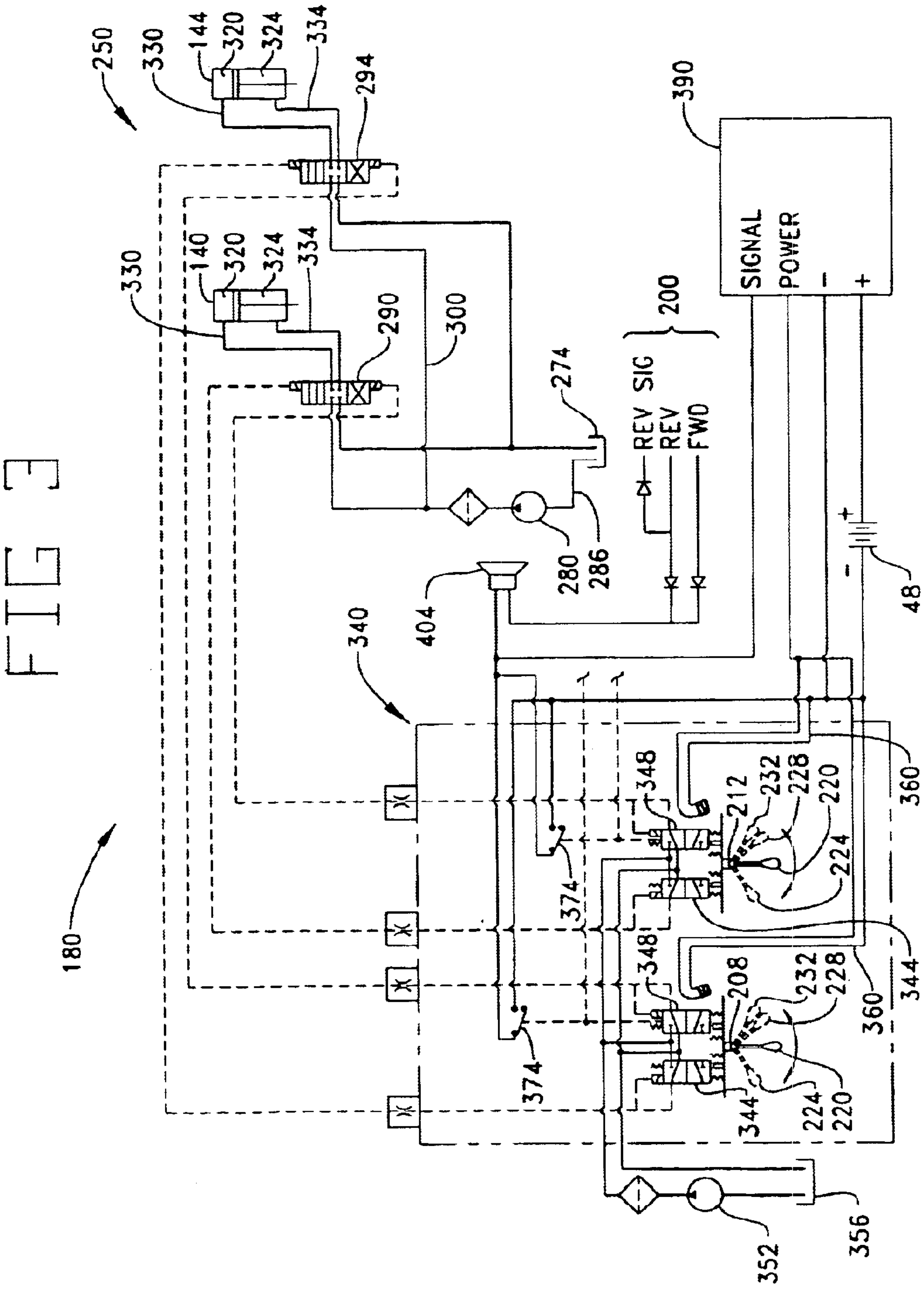
FIG. 3 is an electro-hydraulic schematic utilizing various control systems for the operation of the extension and retraction system in accordance with the present invention.
Figure 4:
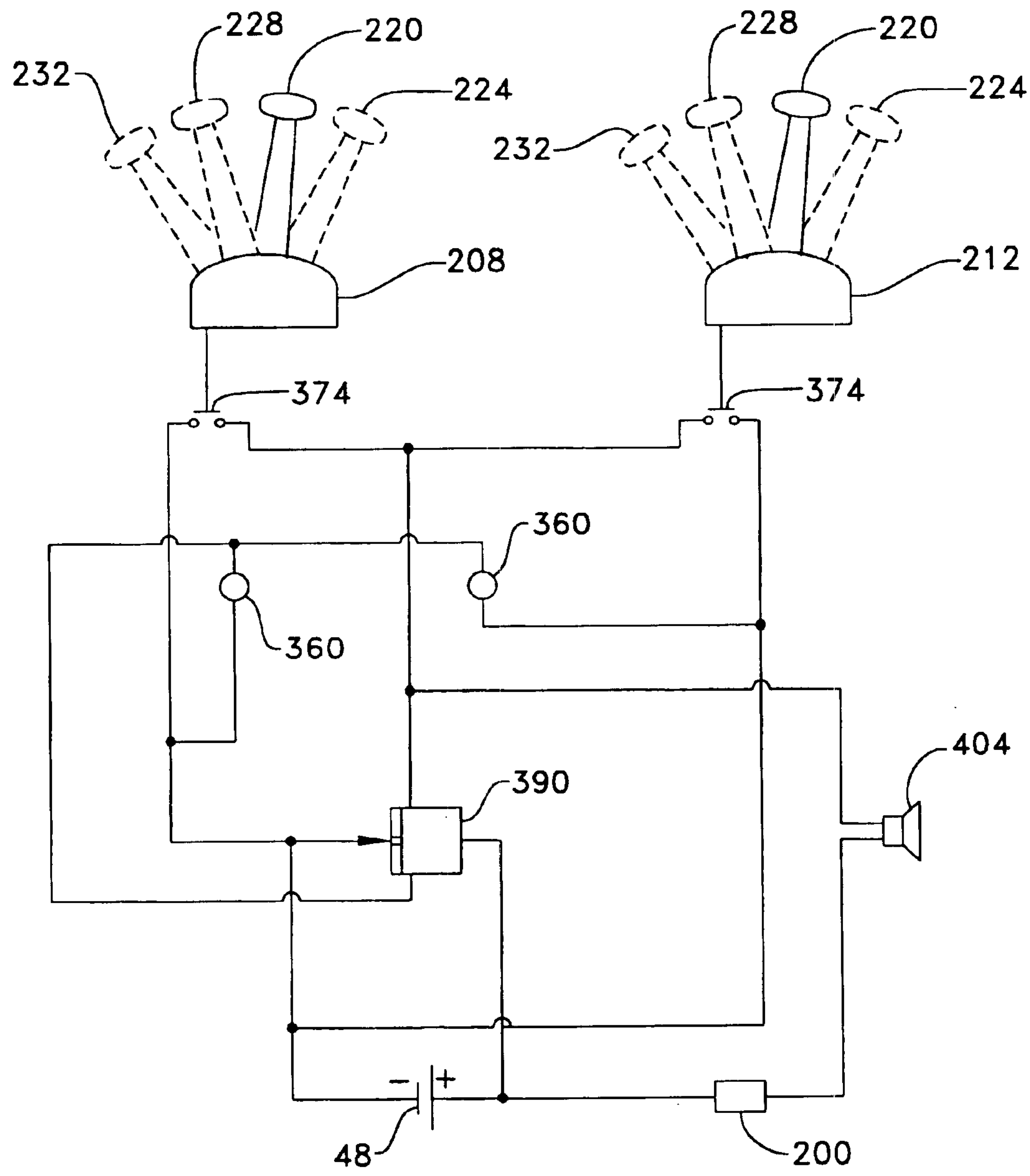
FIG. 4 is a diagrammatic view of one of the control systems shown in FIG. 3.

Referring directly to an electro-hydraulic circuit 180 in FIG. 3, a control device 200 is disposed within the interior portion 64 to allow the operator (not shown) to select either forward or reverse directions of movement for the backhoe loader 10. It should be understood that the control device 200 may be of any suitable design for actuating either a standard or automatic transmission of the backhoe loader 10. A pair of control levers 208,212, shown in a neutral position 220, are accessible to the hands of the operator when the seat 68 is in the rear position 84. The control levers 208,212 are capable of movement between first and second positions 224,228 and an extreme third position 232 located beyond the second position 228.

The electro-hydraulic circuit 180 includes a main control valve system 250 with a reservoir 274 for holding a quantity of hydraulic fluid. The reservoir 274 is connected to a pump 280 via line 286. The pump 280 may be of any suitable type capable of pressurizing the hydraulic fluid. The pump 280 is connected to a pair of spool valves 290,294 via line 300. The spool valves 290,294 may be of any suitable type but capable of actuation from a normally closed position (shown in FIG. 3) to either a first or second open position (not shown). Each of the spool valves 290,294 is connected to a respective one of the pair of hydraulic cylinders 140,144. The piston and rod assembly 164, normally disposed at a mid-position, is capable of moving the stabilizer legs 24,28 between the extended and retracted positions 130,134 dependent upon the introduction of pressurized hydraulic fluid into either upper or lower portions 320,324 of the hydraulic cylinders 140,144 through lines 330,334, respectively, in response to movement of the spool valves 290,294 to either of the first or second open positions (not shown) in a well-known manner.

A pilot control valve system 340 is connected with the main control valve system 250 and includes a pair of pilot valves 344,348 connected with each control lever 208,212 and each spool valve 290,294, respectively. A pump 352 of any suitable type capable of pressurizing the hydraulic fluid is connected with each of the pilot valves 344,348. An additional reservoir 356 for holding a quantity of hydraulic fluid is also connected with the pilot valves 344,348. One of the pair of pilot valves 348 includes a solenoid detent 360 therein of a magnetic type.

An electrical control system 364 is connected between the main control valve system 250 and the pilot valve system 340. The electrical control system includes a control switch 374 connected with one of the pair of pilot valves 348. The control switches 374 are activated by the control levers 208,212 when the control levers 208,212 are moved to the second or third positions 228,232 via the electrical power source 48 in a well-known manner. A timer relay 390 is connected with each of the solenoid detents 360 and the control switches 374. An alarm device 404 is connected with the control switches 374 and the control device 200 and located therebetween.

INDUSTRIAL APPLICABILITY

Prior to operation of the backhoe loader 10 for digging, trenching, and the like, the operator (not shown) will generally stabilize the backhoe loader 10 by extending the stabilizer legs 24,28 into contact with the surrounding terrain. To accomplish the extension, the operator (not shown) will manually move the control levers 208,212 from the neutral position 220 to the first (or extend) position 224. The movement of the control levers 208,212, actuates the pilot valves 344 which, in turn, actuate the respective spool valves 290,294 in a well-known manner. The actuation of the spool valves 290,294 directs high pressure hydraulic fluid into the upper portion 320 of the hydraulic cylinders 140,144 to move the stabilizer legs 24,28 accordingly. It should be understood that the control levers 208,212 may be operated individually to set the stabilizer legs 24,28 at any location between the retracted and extended positions 134, 130.

For retraction of the stabilizer legs 24,28, the operator (not shown) will manually move the control levers 208,212 from the neutral position 220 to the second (or retract) position 228 opposite of the first position 224. The movement of the control levers 208,212, actuates the pilot valves 348 which, in turn, actuate the respective spool valves 290,294 in a well-known manner. The actuation of the spool valves 290,294 directs high pressure hydraulic fluid into the lower portion 324 of the hydraulic cylinders 140,144 to move the stabilizer legs 24,28 accordingly. Again, it should be understood that the control levers 208,212 may be operated individually to set the stabilizer legs 24,28 at any location between the extended and retracted positions 130, 134. Additionally, the movement of the control levers 208, 212 to the second position 228 activates the control switches 374. The control switches 374, in turn, activate the timer relay 390 which activates the solenoid detents 360. The movement of the control device 200 to operate the backhoe loader 10 in either the forward or reverse direction will cause the alarm device 404 to sound when the control levers 208,212 are in the retract position 228. This occurs when the alarm device 404 is activated by a signal from both the activated control device 200 and the activated timer relay 390. However, when the control levers 208,212 are in the retract position 228, the solenoid detents 360 are sufficiently distanced from the control levers 208,212 to prevent the magnetic forces of the solenoid detents 360 from acting on (holding) the control levers 208,212, even though the solenoid detents 360 are activated. Therefore, it should be understood that the control levers 208,212 are designed to return to the neutral position 220 after being moved to either the extend or retract positions 224,228 in response to a spring (not shown) of well-known design disposed within the control levers 208,212.

The automatic retraction of the stabilizer legs 24,28 is accomplished by manually moving either of the control levers 208,212 to the third (or auto-retract) position 232. Similar to the retract position 228, the movement of the control levers 208,212 to the auto-retract position 232 activates the control switches 374. The control switches 374, in turn, activate the timer relay 390 which activates the solenoid detents 360. However, when the control levers 208,212 are located in the auto-retract position 232, the distance of the control levers 208,212 from the solenoid detents 360 is sufficiently close to allow the solenoid detents 232 to magnetically hold the control levers 208,212 in the auto-retract position 232. The magnetic hold of the solenoid detents 360 is controlled by the timer relay 390 for a preselected time, preferably greater than the total time necessary to fully retract the respective stabilizer leg 24,28 from the fully extended position 130. Therefore, the stabilizer legs 24,28 may be moved completely to the fully retracted position 134 from any one of the plurality of extended positions 130 within the preselected time. Of course, it should be understood that simultaneous retraction is accomplished when both of the control levers 208,212 are moved to the auto-retract position 232. However, if the control levers 208,212 are moved by the operator (not shown) during the preselected time, the automatic or simultaneous retraction of the stabilizer legs 24,28 is interrupted. This occurs due to the deactivation of the control switch 374 which allows for the release of the magnetic hold of the solenoid detents 360 on the control levers 208,212. Further, if the operator (not shown) moves the control device 200 into gear during the preselected time, thus selecting the forward or reverse direction of movement for the backhoe loader 10, the alarm device 404 will sound, as similar to when the control levers 208,212 are in the retract position 228. Also, it should be understood that the alarm device 404 will sound if the backhoe loader 10 is in the forward or reverse direction and the control levers 208,212 are moved to the retract position 228. Further, it should be understood that the control lever 208 may be configured in such a manner so as to facilitate the auto-retraction of both of the stabilizer legs 24,28 without the use of control lever 212. This may be accomplished through the utilization of a joystick controller (not shown) in place of the control lever 208 that is capable of movement in various directions.

Other aspects, objects and advantages of this invention can be obtained from a study of the drawings, disclosure and the appended claims.

What is claimed is:

1. A method of automatically retracting a stabilizer leg for a work machine, the work machine operatively associated with a power source and having a control device for selecting forward or reverse directions of movement for the work machine, comprising the steps of:

utilizing a control lever for moving the stabilizer leg between fully extended and fully retracted positions, the control lever being normally located in and biased to a neutral position;

manually moving the control lever to either of an extend position or a retract position;

manually holding the control lever in either of the extend or retract positions to respectively extend or retract the stabilizer leg to any of a plurality of positions between the fully extended and fully retracted positions;

manually moving the control lever to an auto-retract position; and retaining the control lever in the auto-retract position without further manual manipulation thereof through a responsive means that overcomes the biasing action of the control lever to facilitate the automatic retraction of the stabilizer leg from any of the plurality of desired positions to the fully retracted positions, the step of retaining the control lever in the auto-retract position includes the steps of:

activating a control switch by the movement of the control lever to the retract or auto-retract position, the control switch being communicable with the power source;

activating a time delay mechanism in response to the activation of the control switch; and activating a solenoid detent in response to the activation of the time delay mechanism, the solenoid detent acting as the responsive means for retaining the control lever in the auto-retract position and being operative with the time delay mechanism to facilitate the automatic retraction of the stabilizer leg within a preselected time.

2. The method of automatically retracting a stabilizer legs of claim 1, including the step of:

disabling the solenoid detent and interrupting the automatic retraction of the stabilizer leg by manually moving the control lever during the preselected time.

3. The method of automatically retracting a stabilizer leg of claim 2, including the step of:

activating an alarm device coupled with the control device and time delay mechanism by selecting the forward or reverse direction of the work machine with the control device prior to the completion of the preselected time.

4. The method of automatically retracting a stabilizer leg of claim 2, including the step of:

activating an alarm device coupled with the control device and time delay mechanism by having the forward or reverse direction of the work machine selected via the control device and with the control lever in either of the retract or auto-retract positions.

5. The method of automatically retracting a stabilizer leg of claim 1, wherein manually holding the control lever for moving the stabilizer leg from any of the plurality of desired positions to the fully retracted position includes the steps of:

initializing a flow of hydraulic fluid to move from a pump to a hydraulic cylinder in connection with the stabilizer leg;

actuating a pair of pilot valves connected with the pump to an open position through the flow of the hydraulic fluid; and actuating a spool valve connected between the pair of pilot valves and the hydraulic cylinder to an open position through the flow of hydraulic fluid in response to the actuation of the pair of pilot valves.

6. The method of automatically retracting a stabilizer leg of claim 1, including the step of:

utilizing the control lever for moving a second stabilizer leg between fully extended and fully retracted positions;

manually moving the control lever to either of a second extend or retract position;

manually holding the control lever in either of the second extend or retract positions to respectively extend or retract the second stabilizer leg to any of a plurality of desired positions between the fully extended and fully retracted positions;

manually moving the control lever to a second auto-retract position; and retaining the control lever in the second auto-retract position without further manual manipulation thereof through a responsive means that overcomes the biasing action of the control lever to facilitate the automatic retraction of the second stabilizer leg from any of the plurality of desired positions to the fully retracted position.

7. The method of automatically retracting a stabilizer leg of claim 1, including the step of:

utilizing a second control lever for moving a second stabilizer leg between fully extended and fully retracted positions, the second control lever being normally located in and biased to a neutral position;

manually moving the first and second control levers to either of an extend position or a retract position;

manually holding the first and second control levers in either of the extend or retract positions to respectively extend or retract the first and second stabilizer legs to any of a plurality of desired positions between the fully extended and fully retracted positions;

manually moving the first and second control levers to an auto-retract position; and retaining the first and second control levers in the auto-retract position without further manually manipulation thereof through a responsive means that overcomes the biasing action of the first and second control levers to facilitate the automatic and simultaneous retraction of the first and second stabilizer legs from any of the plurality of desired positions to the fully retracted position.

8. The method of automatically retracting a stabilizer leg of claim 7, wherein the step of retaining the first and second control levers in the auto-retract position includes the steps of:

activating a respective control switch by the movement of the first and second control levers to the retract or auto-retract position, the control switches being communicable with the power source;

activating a respective time delay mechanism in response to the activation of the control switches; and activating a respective solenoid detent in response to the activation of the time delay mechanisms, the solenoid detents acting as the responsive means for retaining the first and second control levers in the auto-retract position and being operative with the respective time delay mechanism to facilitate the automatic retraction of the first and second stabilizer legs within a preselected time.

9. A work machine having front and rear end portions, a control panel disposed within an interior of the work machine, a pair of stabilizer legs connected to the rear end portion, a hydraulic cylinder operatively associated with each of the pair of stabilizer legs for moving the stabilizer legs in a plurality of desired positions between fully extended and fully retracted positions via a source of hydraulic fluid, and a control device located within the interior of the work machine for selecting the forward or reverse direction of the work machine, comprising:

a main valve connectable with each of the hydraulic cylinders for controlling the movement of the stabilizer legs;

a pair of pilot valves in connection with each of the main valves;

a pair of control levers in connection with a respective pair of pilot valves for actuation thereof, the control levers normally biased to a neutral position and movable between a first position for actuating the main valves in response to the actuation of one of the pilot valves to extend the stabilizer legs to any of the desired positions, a second position for actuating the main valves in response to the actuation of the other of the one of the pilot valves to retract the stabilizer legs to any of the desired positions, and a third position; and means for automatically retaining the pair of control levers in the third position for actuating the main valves in response to the actuation of the other one of the pilot valves to simultaneously retract the stabilizer legs from any of the desired positions to the fully retracted position within a preselected period of time.

10. The work machine of claim 9, wherein the retaining means includes a control switch connected to each one of the pair of pilot valves and communicable with the power source, a time delay mechanism connected with and responsive to the control switches, and a solenoid detent connected between the time delay mechanism and each of the pair of control levers and operative with the time delay mechanism.

11. The work machine of claim 10, wherein the solenoid detent is engaged with a respective control lever when the respective control lever is in the third position.

12. The work machine of claim 10, wherein movement of the pair of control levers during the preselected time interrupts the simultaneous retraction of the pair of stabilizer legs.

13. The work machine of claim 10, wherein the movement of the work machine via the control device while the pair of control levers is in either of the second or third positions activates an alarm device.

14. A method of automatically retracting a stabilizer leg for a work machine, the work machine operatively associated with a power source and having a control device for selecting forward or reverse directions of movement for the work machine, comprising the steps of:

utilizing a pair of control levers for moving a pair of stabilizer legs between fully extended and fully retracted positions, the control levers being normally located in a neutral position and movable to first, second, and third positions, wherein the movement of either of the control levers to the first position promotes the movement of a respective stabilizer leg to a plurality of extended positions and the movement of either of the control levers to the second position promotes the movement of the respective stabilizer leg to a plurality of retracted positions, the control levers being biased to the neutral position when in the first, second, or third position;

moving either of the control levers to the third position;

automatically maintaining either of the control levers in the third position to overcome the biasing action on the control levers for moving the respective stabilizer leg from any of the plurality of extended or retracted positions to the fully retracted position;

connecting a control switch with each of the respective control levers, the control switch being communicable with the power source;

connecting a time delay mechanism with the control switches;

connecting a solenoid detent with the time delay mechanism;

moving either of the control levers to the second or third position activates the control switch, time delay mechanism, and solenoid detent, the solenoid detent maintaining the respective control lever in the third position in response to the time delay mechanism so that the automatic retraction of the respective stabilizer leg is completed within a preselected time; and moving the control levers during the preselected time disables the solenoid detent and interrupts the automatic retraction of the stabilizer legs.

15. The method of automatically retracting a stabilizer leg of claim 14, including the step of:

activating an alarm device in response to selection of the forward or reverse direction of the work machine when the control lever is in either of the retract or auto-retract positions.

16. The method of automatically retracting a stabilizer leg of claim 14, including the step of:

activating an alarm device in response to selection of the forward or reverse direction of the work machine prior to the completion of the preselected time.

17. A method of automatically retracting a stabilizer leg for a work machine, the work machine operatively associated with a power source and having a control device for selecting forward or reverse directions of movement for the work machine, comprising the steps of:

utilizing a control lever for moving the stabilizer leg between fully extended and fully retracted positions, the control lever being normally located in and biased to a neutral position;

manually moving the control lever to either of an extend position or a retract position;

manually holding the control lever in either of the extend or retract positions to respectively extend or retract the stabilizer leg to any of a plurality of positions between the fully extended and fully retracted positions, including the steps of;

initializing a flow of hydraulic fluid to move from a pump to a hydraulic cylinder in connection with the stabilizer leg;

actuating a pair of pilot valves connected with the pump to an open position through the flow of the hydraulic fluid; and actuating a spool valve connected between the pair of pilot valves and the hydraulic cylinder to an open position through the flow of hydraulic fluid in response to the actuation of the pair of pilot valves;

manually moving the control lever to an auto-retract position; and retaining the control lever in the auto-retract position without further manual manipulation thereof through a responsive means that overcomes the biasing action of the control lever to facilitate the automatic retraction of the stabilizer leg from any of the plurality of desired positions to the fully retracted positions.

18. A method of automatically retracting first and second stabilizer leg for a work machine, the work machine operatively associated with a power source and having a control device for selecting forward or reverse directions of movement for the work machine, comprising the steps of:

utilizing a first control lever for moving the first stabilizer leg between fully extended and fully retracted positions, the first control lever being normally located in and biased to a neutral position;

manually moving the first control lever to either of an extend position or a retract position;

manually holding the first control lever in either of the extend or retract positions to respectively extend or retract the first stabilizer leg to any of a plurality of positions between the fully extended and fully retracted positions;

manually moving the first control lever to an auto-retract position;

retaining the first control lever in the auto-retract position without further manual manipulation thereof through a responsive means that overcomes the biasing action of the first control lever to facilitate the automatic retraction of the first stabilizer leg from any of the plurality of desired positions to the fully retracted positions;

utilizing a second control lever for moving a second stabilizer leg between fully extended and fully retracted positions, the second control lever being normally located in and biased to a neutral position;

manually moving the first and second control levers to either of an extend position or a retract position;

manually holding the first and second control levers in either of the extend or retract positions to respectively extend or retract the first and second stabilizer legs to any of a plurality of desired positions between the fully extended and fully retracted positions;

manually moving the first and second control levers to an auto-retract position;

retaining the first and second control levers in the auto-retract position without further manually manipulation thereof through a responsive means that overcomes the biasing action of the first and second control levers to facilitate the automatic and simultaneous retraction of the first and second stabilizer legs from any of the plurality of desired positions to the fully retracted position, the step of retaining the first and second control levers in the auto-retract position includes the steps;

activating a respective control switch by the movement of the first and second control levers to the retract or auto-retract position, the control switches being communicable with the power source;

activating a respective time delay mechanism in response to the activation of the control switches; and activating a respective solenoid detent in response to the activation of the time delay mechanisms, the solenoid detents acting as the responsive means for retaining the first and second control levers in the auto-retract position and being operative with the respective time delay mechanism to facilitate the automatic retraction of the first and second stabilizer legs within a preselected time.

19. A method of automatically retracting first and second stabilizer legs for a work machine, the work machine operatively associated with a power source and having a control device for selecting forward or reverse directions of movement for the work machine, comprising the steps of:

utilizing a control lever for moving the first stabilizer leg between fully extended and fully retracted positions, the control lever being normally located in and biased to a neutral position;

manually moving the control lever to either of an extend position or a retract position;

manually holding the control lever in either of the extend or retract positions to respectively extend or retract the first stabilizer leg to any of a plurality of positions between the fully extended and fully retracted positions;

manually moving the control lever to an auto-retract position;

retaining the control lever in the auto-retract position without further manual manipulation thereof through a responsive means that overcomes the biasing action of the control lever to facilitate the automatic retraction of the first stabilizer leg from any of the plurality of desired positions to the fully retracted positions;

utilizing the control lever for moving a second stabilizer leg between fully extended and fully retracted positions;

manually moving the control lever to either of a second extend or retract position;

manually holding the control lever in either of the second extend or retract positions to respectively extend or retract the second stabilizer leg to any of a plurality of desired positions between the fully extended and fully retracted positions; and manually moving the control lever to a second auto-retract position; and retaining the control lever in the second auto-retract position without further manual manipulation thereof through a responsive means that overcomes the biasing action of the control lever to facilitate the automatic retraction of the second stabilizer leg from any of the plurality of desired positions to the fully retracted position.

20. The method of automatically retracting first and second stabilizer legs of claim 19, wherein the step of retaining the control lever in the auto-retract position includes the steps of:

activating a control switch by the movement of the control lever to one of the retract or auto-retract positions, the control switch being communicable with the power source;

activating a time delay mechanism in response to the activation of the control switch; and activating a solenoid detent in response to the activation of the time delay mechanism, the solenoid detent acting as the responsive means for retaining the control lever in the auto-retract position and being operative with the time delay mechanism to facilitate the automatic retraction of the first and second stabilizer legs within a preselected time.

* * * * *